Oct. 26, 1943.     J. D. INFIELD     2,332,722
HOSIERY FIT TESTER
Filed April 22, 1942     2 Sheets-Sheet 1

INVENTOR.
JOHN D. INFIELD.
BY John W. Michael
ATTORNEY.

Oct. 26, 1943.  J. D. INFIELD  2,332,722
HOSIERY FIT TESTER
Filed April 22, 1942  2 Sheets-Sheet 2
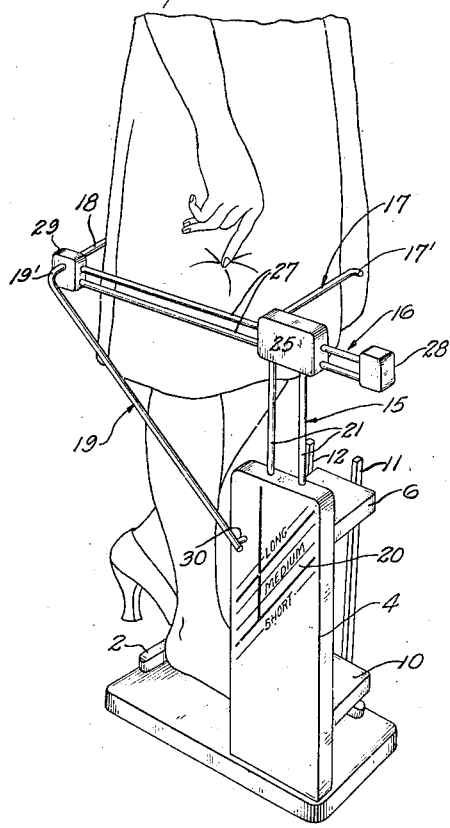
Fig. 5.
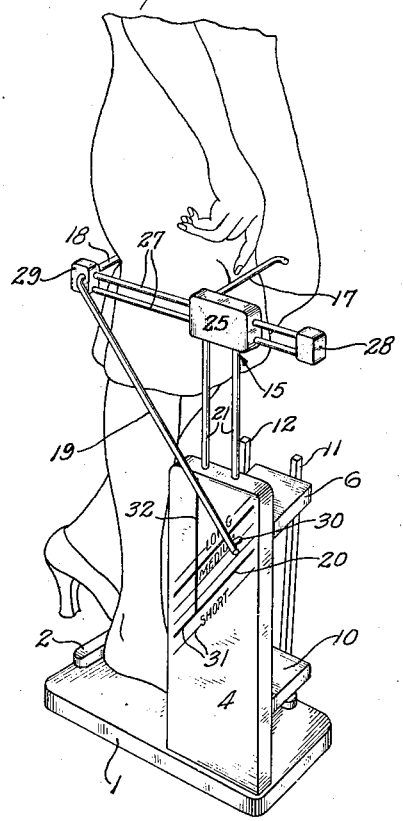
Fig. 6.
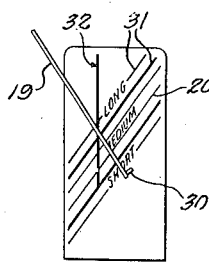 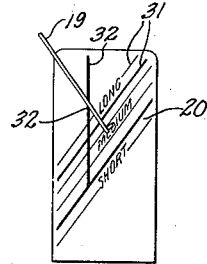 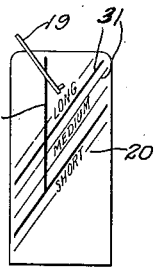 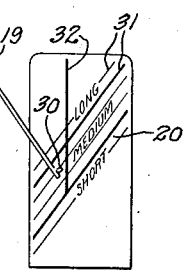
Fig. 7.  Fig. 8.  Fig. 9.  Fig. 10.
INVENTOR.
JOHN D. INFIELD.
BY John W. Michael
ATTORNEY.

Patented Oct. 26, 1943

2,332,722

UNITED STATES PATENT OFFICE 2,332,722

HOSIERY-FIT TESTER

John D. Infield, Milwaukee, Wis., assignor to Holeproof Hosiery Co., Milwaukee, Wis., a corporation of Wisconsin Application April 22, 1942, Serial No. 440,041

4 Claims. (Cl. 33—3)

This invention relates to a hosiery-fit tester designed and adapted to facilitate the accurate determination of foot size so that the purchaser of hosiery will receive the right size and a correct fit.

An object of the invention is to provide a hosiery-fit tester possessed of these capabilities, and which is simple and compact in construction, convenient and comfortable to use, and readily and quickly adjusted to effect the required measurement and thereby determine the foot size.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 5 is a perspective view illustrating the complete hosiery-fit tester embodying the invention and showing the same in the first adjustment involved in measuring leg length and proportion;

Figure 6 is a view similar to Figure 5 showing the final adjustment involved in measuring leg length and proportion;

Figures 12, 13:
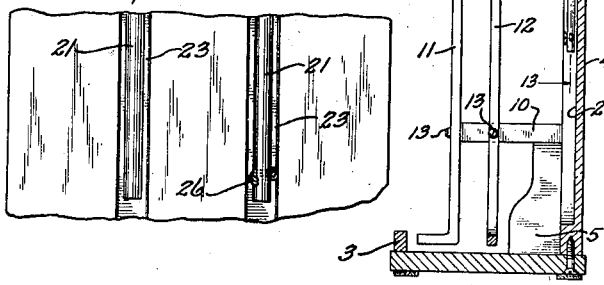
Figure 11:
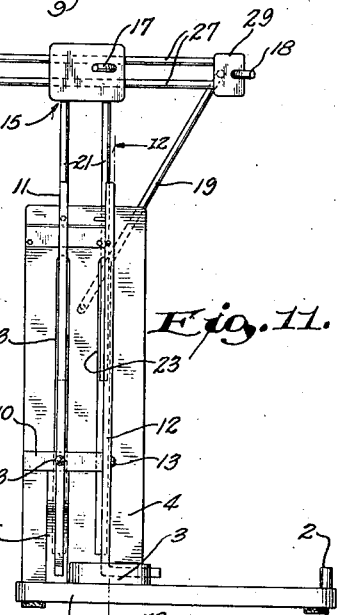

Figures 7, 8, 9, and 10 are views in elevation of the leg length and proportion measuring chart, a portion of its cooperable pointer or indicator being illustrated, and being shown in the various positions which it assumes in measuring different leg lengths and proportions;

Figure 11 is a view in side elevation of the complete hosiery-fit tester;

Figure 12 is a fragmentary sectional view taken on line 12—12 of Figure 11; and

Figure 13 is a fragmentary sectional view taken on line 13—13 of Figure 12.

Figure 2:
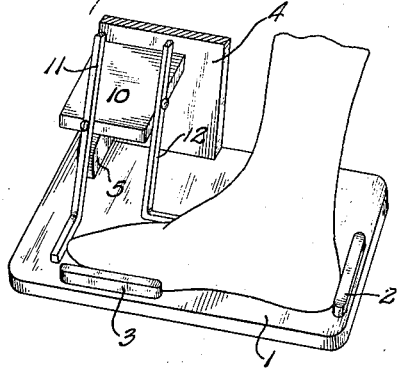
Figure 2 is a fragmentary perspective similar to Figure 1, but taken from a different point of view, to further illustrate the construction.
Figure 1:
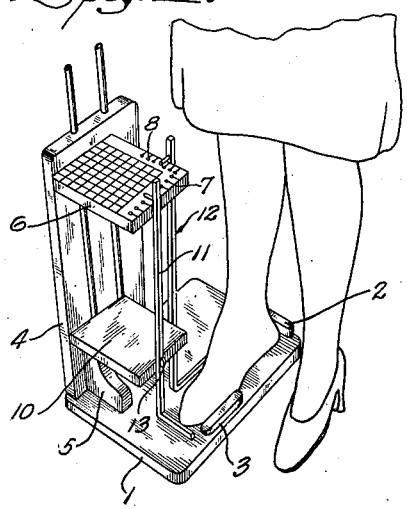
Figure 1 is a fragmentary perspective view illustrating a hosiery-fit tester embodying the present invention and showing the same when used to determine foot size, the instrumentalities employed for determining leg length and proportion being omitted in this view.

Referring to the drawings, it will be seen that the hosiery-fit tester embodying the present invention comprises a platform 1 which is constituted of a rectangular flat plate of wood or other suitable material adapted to rest flatly on the floor and presenting a flat, smooth upper surface. A heel guide 2 is provided on the platform 1 and consists of a strip of wood or other suitable material which is suitably fixed to the platform 1 adjacent one end thereof and parallel to the edge of the end next to which it is disposed. Also fastened to the platform 1 is an outside guide 3 which is of strip-like form and is disposed at right-angles to the guide 2 and so positioned on the platform that it is engageable with one side of the ball portion of the foot placed in position on the platform as illustrated in Figures 1 and 2.

A vertical standard 4, which may be a smooth and finished board, has its lower end suitably fastened to the platform 1 at the side thereof opposite the outside guide 3. A brace or angle bracket 5, which also may be of wood, is suitably fastened to the platform 1 and to the standard 4 to rigidly secure the two together.

A chart plate 6 is fixed to the standard 4 adjacent its upper end. This chart plate may be constituted of a rectangular block of wood or other suitable material, one side of which engages and is fastened to the standard. The chart plate 6 is horizontally disposed and projects inwardly from the standard so as to overlie the platform 1. One edge of the chart plate 6 lies in a vertical plane perpendicular to the vertical inner face of the heel guide 2 and adjacent this edge of the chart plate a scale or dial 7 is provided. This scale or dial may be constituted of any suitable indicia representing or indicating units of measurement based on the standards of construction of the stockings or hosiery to be sold, and in the form illustrated it consists of a row of letters—A to G, inclusive—enclosed in circles and associated with appropriate graduations. Another edge of the chart plate 6 lies in a vertical plane perpendicular to the vertical inner face of the outside guide 3 and along this edge of the chart plate a scale or dial 8 is provided and consists of a row of numbers ranging from 1 to 7, inclusive, enclosed in circles and associated with suitable graduations. The letters of the scale or dial 7 represent foot length sizes, whereby the numbers of the scale or dial 8 represent foot width sizes. On the body of the chart plate 6 a table of foot sizes, designated generally at 9, is provided. This table 9 consists of numbers representing the foot sizes with the numbers disposed in vertical columns and in transverse rows, and with the columns bordered on one side by a scale or dial 7' corresponding to the dial 7, and with the rows provided on one side by a scale or dial 8 corresponding to the scale or dial 8.

A bracket 10 is supported on the standard 4 and on the upper end of its bracket or brace 5. This bracket 10 comprises a rectangular piece of wood or other suitable material corresponding in size to the chart plate 6 and disposed below and parallel thereto.

A foot length measuring bar 11, and a foot width measuring bar 12, are pivotally connected by suitable pivots 13 to adjacent sides of the bracket 10. These measuring bars are of L shape, the vertical leg of each L being pivotally connected to the bracket and the horizontal leg thereof sweeping across the platform so as to be engageable respectively with the toe of the foot and with the side portion thereof adjacent the ball of the foot. The upper ends of the vertical legs of the measuring bars traverse adjacent side edges of the dial plate 6, the vertical leg of the measuring bar 11 thereby also traversing the dial 7, whereas the vertical leg of the bar 12 traverses the scale or dial 8. Pointing pins or indicators 14 and 14' may be combined with the upper ends of the bars 11 and 12, respectively, and may be disposed to project over and sweep across their respective scales or dials 7 and 8.

Figure 3:
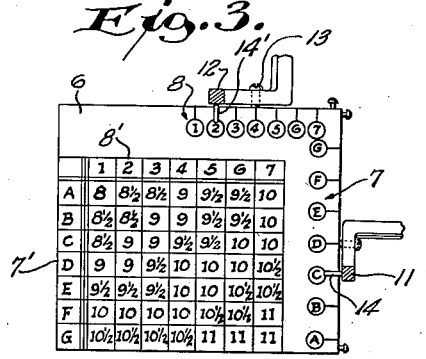
Figure 3 is a view in top plan of the chart plate employed for determining foot measurements, portions of the length and width measuring bars being illustrated in a position to which they are adjusted to measure one foot size.

With this construction, when a foot size is to be determined, the customer places her right foot on the platform 1 with the heel touching the heel guide 2 and the side of the foot touching the outside guide 3, and the customer then places her full weight on the right foot. The heel guide 2 and the outside guide 3 serve to properly locate the customer's foot in the device. The operator of the device then adjusts the bar 11 so that its lower end touches the end of the big toe. The operator then takes the reading of the dial 7, which, in Figure 3, would be C. The operator then adjusts the width measuring bar 12 until it just touches the side of the foot and takes a reading of the dial 8, which, in Figure 3, would be "2." In the example given, we have a foot size indicated as "C-2." Looking at table 9, and following down the column 2 until we meet row C, we find the correct size of the stocking for which the purchaser or customer who has been measured, and in the hosiery for which the device has been designed, to be size 9.

Figure 4:
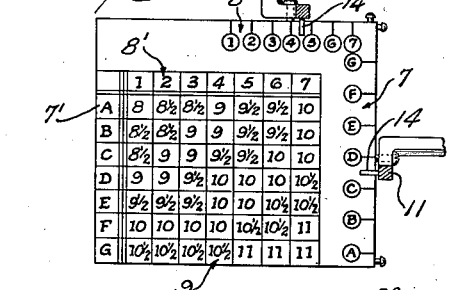
Figure 4 is a view similar to Figure 3 but showing a different adjustment of the length and width measuring bars.

Another example of it is indicated in Figure 4, where the pointer for the foot length registers midway between C and D. In such instances, it is always advisable to use the higher reading. Also, in this case the foot width pointer is positioned midway between 4 and 5. Here again it is advisable to take the higher reading 5. Now, consulting the table 9 as before, we find the correct size for this foot in the hosiery for which the device has been designed is size 10.

The tester also embodies in this construction a leg length and proportion measuring device, which makes use of the platform 1, of the means for locating the foot in proper position thereon, namely the heel guide 2 and the outside guide 3, and of the standard 4.

The leg length and proportion measuring device, in addition to these elements, comprise generally a vertically adjustable carrier, designated as a whole at 15, which is slidably interfitted with the standard 4. A horizontally adjustable carrier, designated as a whole at 16, is slidably interfitted with the upper end of the carrier 15. Thigh-engaging gauge bars 17 and 18 are mounted on and carried by the carriers 15 and 16 respectively. A pointer 19 is mounted on the horizontally adjustable carrier 16 and cooperates with the chart, designated generally at 20, provided on the outside face of the standard 4.

The carrier 15 may advantageously comprise a pair of parallel vertical metal rods 21 which slide through guide bearings 22 provided therefor in the upper end of the standard 4, and are also received in tracks or guide grooves 23 provided in the standard 4 below the bearings or guides 22. At their upper ends the rods 21 are interfitted with and secured to a cross-piece or metal head block 25. In order to retain the carrier 15 in any vertical adjustment, a suitable friction device is provided between at least one of the rods 21 and its track or guide groove 23. As illustrated in Figure 13, this friction device may take the form simply of a cotter pin 26, which is extended through an opening in the lower end of one of the guide rods 21 and is bent around the same so as to be fastened thereto, the head of cotter pin having friction engagement with one of the side walls of the groove or track 23. Of course, any friction shoe or suitable friction device may replace the cotter pin 26.

The cross-piece or head 25 of the vertically adjustable carrier 15 has transversely extending guide or bearing openings therein. The horizontally adjustable carrier 16 may also advantageously comprise a pair of parallel horizontally disposed metal rods 27, which slide through the bearings of the openings in the head or cross-piece 25. The blocks 28 and 29 have openings in which the ends of the rods 27 are fitted and secured.

The gauge bar 17 consists of a metal rod fixed to a head or cross-piece 25 and extending horizontally and laterally therefrom. The end of the gauge bar 17 may be rounded, as at 17', to avoid a pointed or sharp projection. The adjustable gauge bar 18 is similar in construction to the gauge bar 17, and is carried by an end block 29 of the horizontally adjustable slide. The pointer 19 is also in the form of a metal rod which has one end laterally bent as at 19' and rigidly interconnected with the end block 29. The pointer 19 extends downwardly at an angle and its lower end is provided with a pointing pin 30 which traverses the chart 20.

The chart 20 consists of a series of sloping graduations or lines 31 and associated indicia, such as the words "long," "short," and "medium." In addition to the sloping or oblique lines 31 the chart 20 also includes a heavy black vertical line 32 disposed thereon, as illustrated in Figures 5 to 10, inclusive.

With this construction, to determine the accurate leg length and proportion, the prospective purchaser of stockings places her right foot on the platform 1 with her heel engaged with the heel guide 2 and the side of the foot engaged with the outside guide 3 in just the same manner as described in connection with the measuring of the foot. The purchaser then places her finger on the garter button of her right leg, as illustrated in Figure 5, and as she does this the operator of the device pulls upwardly on the vertically adjustable carrier 15 until its gauge bar 17 is in exact horizontal alinement with, or at the same vertical height as, the position of the garter button, as indicated by the purchaser's finger. The horizontal adjustable slide 16 is then slid toward the back of the customer's or purchaser's leg until it just touches the same. Both gauge bars 17 and 18 must just touch the leg, no more, no less. When this has been done, the pointer indicates on the chart 20 the correct leg length and leg proportion. For example, if the pointing pin 30 of the pointer 19 is in the position shown in Figure 7, the indication is that a short length hose is required. Figure 8 requires a medium length requirement, and Figure 9 a long length requirement. When the pointer is positioned as shown in Figure 10, the indication is medium length but also the extra elasticity is desirable. This may be satisfied by supplying the customer with a medium length hose or stocking of the type which has strain-absorbing properties in the region of the stocking above the knee.

The foregoing specification and accompanying drawings describe and illustrate a commercial embodiment of the invention which includes not only the means for measuring a foot for stocking size, but also a leg length and proportion measuring device. The leg length and proportion measuring device, however, is claimed in my divisional application for "Hosiery fit testers," executed November 9, 1942.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A hosiery-fit tester comprising a base plate on which the foot of the wearer is to be placed, a heel abutment strip adjacent one end of said base plate, a fixed abutment strip secured adjacent one side edge of the base plate in spaced relation to the heel abutment strip and at right angles thereto and adapted to engage one side of the foot adjacent the ball portion thereof, a standard secured to the base plate on the side thereof opposite said fixed abutment strip, a bracket secured to said standard near its lower end but above said base plate and projecting toward but terminating in laterally spaced relation to said fixed abutment strip, a chart plate secured to said standard adjacent its upper end and having edges paralleling said strips and provided along their margins with scales representing foot length and width respectively, and a pair of measuring sticks pivotally supported on said bracket and engageable respectively with the toe and side of the foot and having their upper portions provided with pointers traversable along said scales.

2. A hosiery fit tester comprising a platform on which a foot is placed, heel and outside guides secured in fixed position on said platform and against which the heel and one side of the ball portion of the foot are engaged to locate the foot in proper position on the platform, a chart plate supported above said platform in cooperative relation to said guides, said chart plate having marginal edges located in planes perpendicular to said heel and said outside guides and having scales thereon representing length and width sizes, substantially vertically disposed, length and width measuring bars disposed adjacent the marginal edges of said chart plate and in cooperative relation to said heel and said outside guides respectively, and means pivotally supporting said bars for pivotal movement about horizontal axes with the lower ends of the bars swingable toward and away from their cooperable guides and their upper ends traversable along said scales whereby length and width size readings may be taken.

3. A hosiery fit tester comprising a platform on which the foot is placed, two guides secured in fixed position on the platform and disposed in spaced relation and at right angles to each other so that the heel and one side of the ball portion of the foot may be engaged with the side guides to locate the foot in proper position on the platform, a chart plate fixedly supported above said platform in cooperative relation to said guides, said chart plate having marginal edges located in planes perpendicular to said guides and having scales thereon representing length and width sizes, substantially vertically disposed, length and width measuring bars disposed adjacent said chart plate and in cooperative relation to said guides, means supporting said bars for shiftable movement along said scales and toward and away from said guides, the lower ends of the bars being engageable with the toe and with the ball portion of the foot opposite that engaged by one of said guides, the upper ends of said bars traversing the scales whereby the length and width size readings may be taken.

4. A hosiery fit tester comprising a platform on which the foot is placed, heel and outside guides secured in fixed position on said platform and against which the heel and one side of the ball portion of the foot are engaged to locate the foot in proper position on the platform, a chart plate supported above said platform in cooperative relation to said guides, said chart plate having right angularly disposed marginal edges located in planes perpendicular to said heel and outside guides and having scales thereon representing length and width sizes, substantially vertically disposed measuring sticks of substantially L-shaped form, means coacting with the vertical leg of each measuring stick adjacent the lower end thereof to pivotally support it for movement about a horizontal axis, the horizontal leg of each measuring stick sweeping across the platform whereby the horizontal legs are engageable respectively with the toe of the foot and with the opposite side of the ball portion of the foot from that engaged with the outside guide, the upper ends of the legs of the measuring sticks traversing the marginal edges of the chart plate along which the scales are provided to enable length and width size readings to be taken.

JOHN D. INFIELD.